2,826,613
RECOVERY OF SOLID GUANIDINE CARBONATE

Otto Grosskinsky, Elfriede Thürauf, Walter Klempt, and Helmut Umbach, Dortmund-Eving, Germany No Drawing. Application July 8, 1954
Serial No. 442,206

Claims priority, application Germany July 11, 1953

9 Claims. (Cl. 260—564)

The present invention relates to new, useful improvements in the recovery of solid guanidine carbonate and more particularly to the recovery of solid guanidine carbonate from liquids containing the same in dissolved condition.

Guanidine carbonate is very readily soluble in water. It might therefore appear at first glance that it would be possible to recover the solid salts from solutions containing the same in dissolved condition merely by evaporating the solution, allowing the salt to crystallize, and recovering the same by filtration. However, this method is not practicable with guanidine carbonate because guanidine carbonate is decomposed to form ammonia and urea when an aqueous solution containing the same is heated to the boiling point. Evaporating under vacuum is circumventive and expensive and moreover although it somewhat lowers the risk of decomposition, it does not completely avoid it.

In addition, the high water solubility of guanidine carbonate is very troublesome in preparing the salts according to the known methods by converting soluble guanidine salts such as guanidine chloride with suitable soluble carbonates such as potassium carbonate, in an aqueous medium. When guanidine chloride is reacted with potassium carbonate for example according to the following equation:

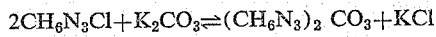

$$2CH_6N_3Cl + K_2CO_3 \rightleftharpoons (CH_6N_3)_2 CO_3 + KCl$$

the amount of precipitated solid guanidine carbonate obtained is rather small, as will be later shown. In addition, the valuable potassium carbonate is converted during the process to potassium chloride which has a much lower value. Similar conditions prevail when processing other guanidine salts such as guanidine thiocyanate ($CH_6N_3SCN$), as starting material.

It is therefore a primary object of the present invention to provide a process of obtaining solid guanidine carbonate from solutions containing the same without any danger of decomposition of the guanidine carbonate.

It is another object of the present invention to provide a process of recovering solid guanidine carbonate in high yield from aqueous solutions containing the same.

It is still another object of the present invention to provide a process of producing guanidine carbonate in solution and obtaining the formed guanidine carbonate from the solution.

It is yet another object of the present invention to provide a process of precipitating guanidine carbonate from solutions containing the same and being formed by reacting a guanidine salt with a soluble carbonate such as an alkali metal or ammonium carbonate.

It is a further object of the present invention to provide a continuous method of producing guanidine carbonate by the thermal treatment of ammonium thyocyanate to form guanidine thiocyanate and the conversion of the guanidine thiocyanate to guanidine carbonate in aqueous solution and the recovery of the guanidine carbonate in solid form from the aqueous solution.

Other objects and advantages of the present invention will be apparent from a further reading of the specification and of the appended claims.

With the above objects in view, the present invention mainly consists in a process of obtaining solid guanidine carbonate from solutions containing the same, comprising the steps of adding ammonia to a solution comprising guanidine carbonate and a solvent therefor, thereby lowering the solubility of the guanidine carbonate in the solvent and causing precipitation of the same from the solution, and recovering the thus precipitated solid guanidine carbonate.

The present invention is based on our discovery that the solubility of guanidine carbonate in water or in a suitable organic solvent therefor is greatly lowered by the presence of a sufficient amount of free ammonia introduced into the solution. This discovery offers the possibility of recovering solid guanidine carbonate from its solutions without either the necessity of special vacuum operating devices or the risk of losses by decomposition.

The precipitation of the solid guanidine carbonate from the solutions containing the same by the addition of ammonia to the solution without any danger of decomposition of the guanidine carbonate is enhanced by cooling the solution, preferably during the addition of the ammonia thereto, to relatively low temperatures of 10° C. or lower and preferably to a temperature of about 0° C.

Moreover, the reduced solubility of guanidine carbonate by the presence of free ammonia considerably improves the yield of the solid salt precipitated when reacting a guanidine salt with a soluble carbonate, e. g. as in the above equation. In this connection, the precipitation of the formed guanidine carbonate moves the equilibrium of the equation to the right so that not only is the guanidine carbonate easily obtained in solid form, but the yield of guanidine carbonate is higher.

Therefore it is a preferred embodiment of the present invention to produce guanidine carbonate by the reaction of a soluble guanidine salt such as guanidine sulfate, guanidine chloride, guanidine thiocyanate, etc., with a water-soluble carbonate, and particularly with the alkali metal salt carbonates and ammonium carbonate in the presence of free ammonia, whereby the formed guanidine carbonate is precipitated from the solution due to the presence of the ammonia. This precipitation may be enhanced by cooling the solution. The reaction may be carried out in any suitable solvent, but is of course most preferably carried out in water.

Furthermore, the presence of excess free ammonia offers a method of preparing solid guanidine carbonate by reacting a guanidine salt with a carbonate of ammonium selected from the group consisting of ammonium carbonate and ammonium bicarbonate. When substituting e. g. in the above equation the potassium carbonate by an ammonium carbonate, no precipitation of solid guanidine carbonate takes place at all. On the contrary, when preparing an aqueous solution containing guanidine carbonate and ammonium chloride and heating the same to an only moderate temperature, the reaction takes place, proceeding from the right to the left side of the above equation (in which $K_2CO_3$ is to be assumed as substituted by $(NH_4)_2CO_3$); the ammonium carbonate is decomposed to form $NH_3$ and $CO_2$ which escape, and guanidine chloride is formed again almost quantitatively.

However, when preparing a mixture of guanidine chloride (or guanidine thiocyanate) and ammonium carbonate (or bicarbonate) dissolved in water, and introducing ammonia into said solution, preferably under cooling to about 0° C., appreciable amounts of guanidine carbonate are precipitated. In this way an ammonium carbonate may be used as a cheap and useful reactant.

In addition, the possibility of employing a carbonate of ammonium offers a further important advantage: When starting from guanidine thiocyanate (obtained e. g. by thermal treatment of ammonium thiocyanate according to patent application Serial No. 302,786, filed August 5, 1952, now Patent No. 2,700,056) and converting said guanidine thiocyanate with ammonium carbonate in the presence of sufficient free ammonia according to the present invention, ammonium thiocyanate is reobtained as a by-product (in lieu of potassium thiocyanate), this being a valuable starting material for preparing new guanidine thiocyanate. Thus, when considering the present invention as a continuation of the aforesaid production of guanidine thiocyanate, the entire manufacturing process, i. e. the method starting from ammonium thiocyanate to the production of guanidine carbonate, proceeds substantially without obtaining out-of-the-way by-products which might not be utilizable.

The amount of ammonia to be added to the solution in order to cause precipitation of the guanidine carbonate therefrom will vary greatly depending upon various conditions such as the concentration of the solution, the particular solvent, the temperature to which the solution is cooled, etc. The particular amount may be easily determined by anyone skilled in the art by simple pre-testing of a sample of the solution, so that specific amounts of ammonia which would be necessary need not be given. In general, an amount of ammonia which is 25% by weight of the weight of the solvent will be sufficient. The upper limit as to the amount of ammonia is only determined by economic considerations so that no actual upper limit can be given, although as a practical matter the amount of ammonia need not be greater than 2 times the weight of the solvent.

In this connection it should be noted that generally, as shown by the examples, considerable amounts of ammonia are added to the liquids or solutions, which amounts are much greater than the solvent, e. g. water, could ordinarily absorb at room temperature and at atmospheric pressure. It might therefor be assumed that the incorporation of such large amounts of ammonia in the liquid would require superatmospheric pressure, e. g. working in closed vessels. Surprisingly however this is not necessary. The solutions containing the guanidine carbonate can absorb much greater amounts of ammonia than could be absorbed by the pure solvent under ordinary conditions and, it is preferable according to the present invention to utilize the ammonia in such amount, which is greater than the amount that the solvent could ordinarily absorb, in order to better precipitate the guanidine carbonate from the solution.

Although this phenomenon cannot be explained exactly, it may be assumed that ammonia reacts with certain salts, such as guanidine thiocyanate, guanidine chloride, ammonium thiocyanate etc., forming additive compounds which are analogous to the Diver's liquid obtained, as is known, by reacting solid ammonium nitrate with gaseous $NH_3$ at about 0° C., and that aqueous solutions of the aforesaid salts show a raised absorbing property to gaseous ammonia, corresponding to the behavior of the respective solid salts.

For carrying out the conversion of a guanidine salt with ammonium carbonate, the theoretical amount of ammonium carbonate or bicarbonate (or a mixture of ammonium carbonate and bicarbonate) is sufficient; a certain excess increases the yield, but care should be taken that no slightly soluble ammonium carbonate is separated which would contaminate the solid guanidine carbonate formed. Of course, the ammonium carbonates can be added also in the form of their constituents, $NH_3$ and $CO_2$.

The excess free ammonia can be added either as gaseous $NH_3$ or as concentrated aqueous ammonia. Cooling the reaction mixture is always preferable for further dropping the solubility of guanidine carbonate and raising the yield accordingly. As a rule, cooling to about 0° to 10° C. will be satisfactory, but lower temperatures are suitable also. In all events, cooling should take place whenever introducing gaseous ammonia, on account of the high absorption heat of ammonia when dissolved. The mother liquors separated from the solid guanidine carbonate contain, more or less, large amounts of free ammonia which is recovered by distillation under vacuum. During this procedure, the temperature of the liquids is strongly lowered, said liquids thus being very suitable cooling agent for other reaction mixtures, fairly paying the expenses of the aforesaid vacuum distillation, the respective distillation apparatus incidentally acting as a refrigerator.

In general, water is the most important medium for the process of the present invention. It should be noted, however, that organic solvent liquids may be employed also, according to the conditions of solubility of the salts employed and produced. Such solvents are e. g. alcohols, such as methanol, ethanol, cyclohexanol; etheralcohols, such as methoxyethanol; ketones, such as acetones, butanone, cyclohexanone; lower esters, such as methyl acetate; organic bases, such as pyridine, etc.

The invention will be further illustrated but is not intended to be limited by the following examples in which the parts stated are parts by weight:

*Example I*

100 parts of a crude guanidine carbonate containing 4 parts of guanidine thiocyanate are dissolved at 100° C. in 118 parts of water, forming a saturated solution at this temperature. The solution is gradually cooled to 20° C. whereby 47.9 parts of guanidine carbonate crystallize out, being removed by centrifuging. 52 parts of gaseous $NH_3$ are introduced into the mother liquor at room temperature, 47 additional parts of guanidine carbonate are precipitated so that 94.9 parts of the salt are recovered altogether, the salt being completely free of thiocyanate.

*Example II*

Two solutions are prepared: (1) 100 parts of guanidine thiocyanate in 67 parts of water, (2) 58.8 parts of potassium carbonate in 33 parts of water.

Both solutions are mixed whereby 55.5 parts of guanidine carbonate are precipitated and separated by centrifuging. 42 parts of gaseous ammonia are introduced into the remaining mother liquor, whereby 14 parts of additional guanidine carbonate are precipitated.

*Example III*

100 parts of guanidine sulfate are dissolved in 120 parts of concentrated aqueous ammonia (25%) and 40 parts of ammonium bicarbonate are added. Subsequently 30 parts of gaseous ammonia are introduced, the liquid being gradually cooled to about —20° C. and allowed to stand one hour at this temperature. The solid guanidine carbonate precipitated is separated by filtering or centrifuging. Yield 68 parts (=81% of the theoretical amount).

In the absence of excess free ammonia no guanidine carbonate is precipitated at all.

*Example IV*

100 parts of guanidine chloride are dissolved in 100 parts of water whereupon 100 parts of gaseous ammonia are introduced under cooling. It is possible also to dissolve the salt in 130 parts of concentrated aqueous ammonia (25%) and subsequently introduce 70 parts of gaseous ammonia. The liquid prepared, one way or the other, is gradually cooled to —10° C, 50 parts of carbon dioxide being introduced during this cooling period. The mixture is allowed to stand one hour at —10° C., 57 parts of solid guanidine carbonate having been formed and being recovered as stated in Example III. The yield is 60% of the theoretical amount.

Example V 100 parts of guanidine thiocyanate are dissolved in 150 parts of water. Then 20 parts of gaseous ammonia are introduced into the solution. Subsequently 34 parts of ammonium bicarbonate are added. The mixture is cooled to about $+7°$ C. and 150 parts of gaseous $NH_3$ are additionally introduced. The guanidine carbonate precipitated is removed by centrifuging. Yield 63 parts (=83% of the theoretical amount).

Example VI 100 parts of guanidine thiocyanate are dissolved in 80 parts of methanol, 15 parts of gaseous ammonia being introduced into this liquid. Then 40 parts of ammonium bicarbonate are added and 20 parts of gaseous ammonia are additionally introduced while gradually cooling the liquid to $+5°$ C. The liquid is allowed to stand one hour at 5° C., 57 parts of guanidine carbonate having crystallized out after this time which are recovered as stated in Example III.

Example VII 100 parts of ammonium thiocyanate are processed according to the method disclosed in patent application Serial No. 302,786, filed August 5, 1952, now Patent No. 2,700,056, in order to substantially convert the ammonium thiocyanate into guanidine thiocyanate. 77.6 parts of a molten mass are obtained, said mass containing about 64.6 parts of guanidine thiocyanate
5.0 parts of thiourea
7.7 parts of ammonium thiocyanate
0.3 parts of impurities.

This mass is dissolved in 110 parts of water and the solution filtrated. 22 parts of ammonium bicarbonate are added. The reaction mixture is cooled to about 5° C. 135 parts of gaseous ammonia being introduced at the aforesaid temperature. 40 parts of solid guanidine carbonate are precipitated, subsequently filtered off, washed with a small amount of water and dried.

The mother liquid is evaporated to dryness, whereby the ammonia is recovered, the remainder substantially consisting of:

41.5 parts of ammonium thiocyanate
12.5 parts of guanidine thiocyanate
5.0 parts of thiourea
_____
59.0 total The thiourea can react just as ammonium thiocyanate. These 59 parts of the remainder may be returned as such, i. e. without adding further substances, to the aforesaid thermal treatment stage in order to be converted into fresh guanidine thiocyanate (eventually the remainder of a series of charges may be combined and commonly processed). However, the proceeding may also be as follows:

41 parts of ammonium thiocyanate are added to the aforesaid remainder, to form 100 parts of a mixture which is subsequently thermal-treated according to the above application. When again processing the molten mass obtained in a second batch with 22 parts of ammonium bicarbonate and ammonia, as above, 40 other parts of guanidine carbonate are obtained. This process is susceptible of being arbitrarily repeated, so that, as a permanent result, 41 parts of ammonium thiocyanate invariably yield 40 parts of guanidine carbonate, this being 82.5% of the theoretical amount, the following reaction equations being supposed:

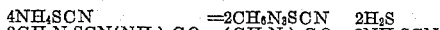
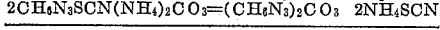
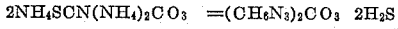

(According to the theory, 41 parts of ammonium thiocyanate would yield 48.5 parts of guanidine carbonate.)

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing and recovering solid guanidine carbonate, comprising the steps of forming an aqueous solution of a water-soluble guanidine salt selected from the group consisting of guanidine sulfate, guanidine thiocyanate and guanidine chloride and a water-soluble carbonate selected from the group consisting of alkali metal carbonates, ammonium carbonate and ammonium bicarbonate in water in the presence of ammonia and adjusting the temperature of the solution to a maximum of 20° C., thereby causing double decomposition reaction between said guanidine salt and said carbonate to produce guanidine carbonate and another salt, the guanidine carbonate being precipitated substantially as it is produced due to the ammonia which in said solution lowers the solubility of said guanidine carbonate while said other salt remains in solution so that the equilibrium of said double decomposition reaction is shifted to result in substantially complete conversion of said guanidine salt to guanidine carbonate; and recovering the thus precipitated solid guanidine carbonate.

2. A method of producing and recovering solid guanidine carbonate, comprising the steps of forming an aqueous solution of a water-soluble guanidine salt selected from the group consisting of guanidine sulfate, guanidine thiocyanate and guanidine chloride and ammonium carbonate in water in the presence of ammonia and adjusting the temperature of the solution to a maximum of 20° C., thereby causing double decomposition reaction between said guanidine salt and said carbonate to produce guanidine carbonate and another salt, the guanidine carbonate being precipitated substantially as it is produced due to the ammonia which in said solution lowers the solubility of said guanidine carbonate while said other salt remains in solution so that the equilibrium of said double decomposition reaction is shifted to result in substantially complete conversion of said guanidine salt to guanidine carbonate; and recovering the thus precipitated solid guanidine carbonate.

3. A method of producing and recovering solid guanidine carbonate, comprising the steps of forming an aqueous solution of a water-soluble guanidine salt selected from the group consisting of guanidine sulfate, guanidine thiocyanate and guanidine chloride and ammonium bicarbonate in water in the presence of ammonia and adjusting the temperature of the solution to a maximum of 20° C., thereby causing double decomposition reaction between said guanidine salt and said carbonate to produce guanidine carbonate and another salt, the guanidine carbonate being precipitated substantially as it is produced due to the ammonia which in said solution lowers the solubility of said guanidine carbonate while said other salt remains in solution so that the equilibrium of said double decomposition reaction is shifted to result in substantially complete conversion of said guanidine salt to guanidine carbonate; and recovering the thus precipitated solid guanidine carbonate.

4. A method of producing and recovering solid guanidine carbonate, comprising the steps of forming an aqueous solution of guanidine thiocyanate and ammonium carbonate in water in the presence of ammonia and adjusting the temperature of the solution to a maximum of 20° C., thereby causing double decomposition reaction between said guanidine salt and said carbonate to produce guanidine carbonate and another salt, the guanidine carbonate being precipitated substantially as it is produced due to the ammonia which in said solution lowers the solubility of said guanidine carbonate while said other salt remains in solution so that the equilibrium of said double decomposition reaction is shifted to result in substantially complete conversion of said guanidine salt to guanidine carbonate; and recovering the thus precipitated solid guanidine carbonate.

5. A method of producing and recovering solid guanidine carbonate, comprising the steps of forming an aqueous solution of a water-soluble guanidine salt selected from the group consisting of guanidine sulfate, guanidine thiocyanate and guanidine chloride and a potassium carbonate in water in the presence of ammonia and adjusting the temperature of the solution to a maximum of 20° C., thereby causing double decomposition reaction between said guanidine salt and said potassium carbonate to produce guanidine carbonate and another salt, the guanidine carbonate being precipitated substantially as it is produced due to the ammonia which in said solution lowers the solubility of said guanidine carbonate while said other salt remains in solution so that the equilibrium of said double decomposition reaction is shifted to result in substantially complete conversion of said guanidine salt to guanidine carbonate; and recovering the thus precipitated solid guanidine carbonate.

6. A method of producing and recovering solid guanidine carbonate, comprising the steps of adding to an aqueous solution of a water-soluble guanidine salt selected from the group consisting of guanidine sulfate, guanidine thiocyanate and guanidine chloride carbon dioxide and ammonia in excess of the amount required to completely convert said carbon dioxide to ammonium carbonate while adjusting the temperature of the solution to a maximum of 20° C., thereby causing double decomposition reaction between said guanidine salt and the formed ammonium carbonate to produce guanidine carbonate and an ammonium salt, the guanidine carbonate being preciptated substantially as it is formed due to the presence of the excess ammonium which in said solution lowers the solubility of said guanidine carbonate while said ammonium salt remains in solution so that the equilibrium of said double decomposition reaction is shifted to result in substantially complete conversion of said guanidine salt to guanidine carbonate; and recovering the thus precipitated solid guanidine carbonate.

7. A method of producing a recovering solid guanidine carbonate, comprising the steps of forming an aqueous solution of guanidine thiocyanate and a water-soluble carbonate selected from the group consisting of alkali metal carbonates, ammonium carbonate and ammonium bicarbonate in the presence of ammonia and adjusting the temperature of the solution to a maximum of 20° C., thereby causing double decomposition reaction between said quanidine thiocyanate and said carbonate to produce guanidine carbonate and another thiocyanate salt, the guanidine carbonate being precipitated substantially as it is produced due to the ammonia which in said solution lowers the solubility of said guanidine carbonate while said other thiocyanate salt remains in solution so that the equilibrium of said double decomposition reaction is shifted to result in substantially complete conversion of said guanidine thiocyanate to guanidine carbonate; and recovering the thus precipitated solid guanidine carbonate.

8. A method of producing and recovering solid guanidine carbonate, comprising the steps of thermally treating ammonium thiocyanate to form a reaction mass including guanidine thiocyanate; dissolving the thus formed reaction mass in water; filtering the thus formed aqueous solution; adding ammonia and an ammonium carbonate to said filtered aqueous solution and adjusting the temperature of the solution to a maximum of 20° C., thereby causing double decomopsition reaction between said guanidine thiocyanate and said carbonate to produce guanidine carbonate and ammonium thiocyanate, the guanidine carbonate being precipitated substantially as it is produced due to the ammonia which in said solution lowers the solubility of said guanidine carbonate while said ammonium thiocyanate remains in solution so that the equilibrium of said double decomposition reaction is shifted to result in substantially complete conversion of said guanidine thiocyanate to guanidine carbonate; removing said precipitated guanidine carbonate from the remaining solution; evaporating said solution to dryness, thereby obtaining ammonium thiocyanate; subjecting the thus obtained dried residue of ammonium thiocyanate to thermal treatment to form additional guanidine thiocyanate; and continuing the process to the recovery of solid guanidine carbonate.

9. A method of producing and recovering solid guanidine carbonate, comprising the steps of thermally treating ammonium thiocyanate to form a reaction mass including guanidine thiocyanate; dissolving the thus formed reaction mass in water; filtering the thus formed aqueous solution; adding ammonia and an ammonium carbonate to said filtered aqueous solution and adjusting the temperature of the solution to a maximum of 20° C., thereby causing double decomposition reaction between said guanidine thiocyanate and said carbonate to produce guanidine carbonate and ammonium thiocyanate, the guanidine carbonate being precipitated substantially as it is produced due to the ammonia which in said solution lowers the solubility of said guanidine carbonate while said ammonium thiocyanate remains in solution so that the equilibrium of said double decomposition reaction is shifted to result in substantially complete conversion of said guanidine thiocyanate to guanidine carbonate; removing said precipitated guanidine carbonate from the remaining solution; evaporating said solution to dryness, thereby obtaining ammonium thiocyanate; subjecting the thus obtained dried residue of ammonium thiocyanate along with fresh ammonium thiocyanate to thermal treatment to form additional guanidine thiocyanate; and continuing the process to the recovery of solid guanidine carbonate.

References Cited in the file of this patent

UNITED STATES PATENTS

| 1,417,369 | Davis | May 23, 1922 |
| 1,902,400 | Gluud | Mar. 21, 1933 |
| 2,221,478 | Hill et al. | Nov. 12, 1940 |
| 2,629,492 | Kurtz et al. | Feb. 24, 1953 |
| 2,676,984 | Marsh | Apr. 27, 1954 |

FOREIGN PATENTS

| 639,940 | Great Britain | July 12, 1950 |
| 1,031,040 | France | July 18, 1953 |